United States Patent
Joo et al.

(10) Patent No.: US 11,467,598 B2
(45) Date of Patent: Oct. 11, 2022

(54) METHOD OF ESTIMATING POSITION IN LOCAL AREA OF LARGE SPACE AND ROBOT AND CLOUD SERVER IMPLEMENTING THEREOF

(71) Applicant: LG ELECTRONICS INC., Seoul (KR)

(72) Inventors: Jinuh Joo, Seoul (KR); Jungsik Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 77 days.

(21) Appl. No.: 16/885,991

(22) Filed: May 28, 2020

(65) Prior Publication Data
US 2021/0109541 A1  Apr. 15, 2021

(30) Foreign Application Priority Data
Oct. 10, 2019  (KR) .......................... 10-2019-0125202

(51) Int. Cl.
*G05D 1/02* (2020.01)

(52) U.S. Cl.
CPC ......... *G05D 1/0246* (2013.01); *G05D 1/0274* (2013.01); *G05D 1/0285* (2013.01); *G05D 2201/0213* (2013.01)

(58) Field of Classification Search
CPC .. G05D 1/0246; G05D 1/0285; G05D 1/0274; G05D 2201/0213
See application file for complete search history.

(56) References Cited

U.S. PATENT DOCUMENTS

| | | | |
|---|---|---|---|
| 11,020,860 B2* | 6/2021 | Cheuvront | A47L 9/0477 |
| 2011/0193721 A1* | 8/2011 | Koie | B60R 25/00 340/901 |
| 2013/0207816 A1* | 8/2013 | Olson | G08G 1/0962 340/901 |
| 2019/0038099 A1* | 2/2019 | Hoshino | G05D 1/0246 |
| 2019/0213438 A1* | 7/2019 | Jones | G06K 9/6274 |
| 2019/0220043 A1* | 7/2019 | Zamora Esquivel | G05D 1/0011 |
| 2020/0108833 A1* | 4/2020 | Sim | G05D 1/0246 |
| 2020/0327367 A1* | 10/2020 | Ma | G06N 3/04 |
| 2020/0351537 A1* | 11/2020 | Browy | H04N 21/4126 |
| 2020/0379455 A1* | 12/2020 | Yang | G05D 1/0044 |
| 2021/0034889 A1* | 2/2021 | Subramanian | G06T 7/20 |
| 2021/0089772 A1* | 3/2021 | Yang | G05D 1/0278 |
| 2021/0172741 A1* | 6/2021 | Liu | B25J 9/00 |
| 2021/0191407 A1* | 6/2021 | Benisch | G05D 1/0221 |

FOREIGN PATENT DOCUMENTS

CN   109885639 A  *  6/2019  ............ G06F 16/26

* cited by examiner

*Primary Examiner* — Hunter B Lonsberry
*Assistant Examiner* — Harrison Heflin
(74) *Attorney, Agent, or Firm* — KED & Associates LLP

(57) ABSTRACT

A method for estimating a position of a robot in a local area of a large space and a robot and a cloud server that implement such method are provided. The robot includes a local area classifier configured to identify a local area of a plurality of local areas of the space in which the robot moves and a plurality of position estimators configured to estimate the position of the robot in the local area.

20 Claims, 10 Drawing Sheets

◯ : CENTER POINT OF INTERSECTION

METHOD OF ESTIMATING POSITION IN LOCAL AREA OF LARGE SPACE AND ROBOT AND CLOUD SERVER IMPLEMENTING THEREOF

CROSS-REFERENCE TO RELATED APPLICATION

This application claims priority under 35 U.S.C. § 119 to Korean Application No. 10-2019-0125202 filed on Oct. 10, 2019, whose entire disclosure is hereby incorporated by reference.

BACKGROUND

1. Field

The present disclosure relates to a method of estimating a position in a local area of a large space, and a robot and a cloud server implementing such method.

2. Background

Robots may identify current positions of the robots in the case where the robots drive in large spaces, for example, large indoor spaces. Current position information of robots may be precisely provided during autonomous driving of robots and performance of various operations (e.g., delivery, guidance, cleaning, and security) of robots.

In some examples, global positioning system (GPS) may be used to acquire position information in the large spaces. However, the GPS may have low precision in position, which may result in failure to perform operations of robots. The GPS may have degraded precision or may not receive signals in the indoor spaces.

The present disclosure describes a method for precisely acquiring position information of the robot in the large space.

BRIEF DESCRIPTION OF THE DRAWINGS

The embodiments will be described in detail with reference to the following drawings in which like reference numerals refer to like elements and wherein.

DETAILED DESCRIPTION

Hereinafter, in the present disclosure, a robot includes devices having various shapes, and that have specific purposes (e.g., delivery, cleaning, security, monitoring, guidance, and the like) or move and perform functions according to properties of spaces where the robot moves. Therefore, according to the present disclosure, the robot collectively refers to a device that includes a driver (i.e., a moving unit) that may move based on predetermined information and using a sensor (or camera) and performs a predetermined function.

In the present disclosure, the robot with the map may move. The map refers to information on fixed objects such as images of streets, fixed walls, buildings, and stairs that are found not to move in space. In some examples, information on moving obstacles that are disposed periodically. For example, dynamic objects may also be stored in the map.

In some examples, the robot may transmit and receive information to and from a cloud server through communication to acquire precise position information while moving in a large space. In this process, the robot may receive map information from the cloud server. Alternatively, the robot may transmit, to the cloud server, the information acquired by the robot within a predetermined range including the area in which the robot is located.

The cloud server may process the received information to generate new map information and may transmit the map information to the robot. The robot may determine the current position of the robot based on the received information or information stored in the robot.

The robot may acquire the position information while the robot moves in the large space. In particular, precisely identifying a current position of the robot, which has left from a previous position of the robot in the large indoor space, may take a long time and requires a lot of computing resources.

Application of a technique of, to the large space, estimating the current position coordinate of the robot using the image of the robot input through the deep learning also takes a lot of time or requires a lot of computing resources. In particular, the position of the robot may be difficult to be identified through one deep learning network in the large indoor spaces such as airports and shopping malls.

According to an embodiment, the present disclosure divides map and deep learning network constituting the map and provides a plurality of deep learning networks. The inner space is primarily described below, but the present disclosure is not limited thereto. In some examples, at least one deep-learning network is used on at least one local area to estimate the position of the robot in the large space.

Figure 1:
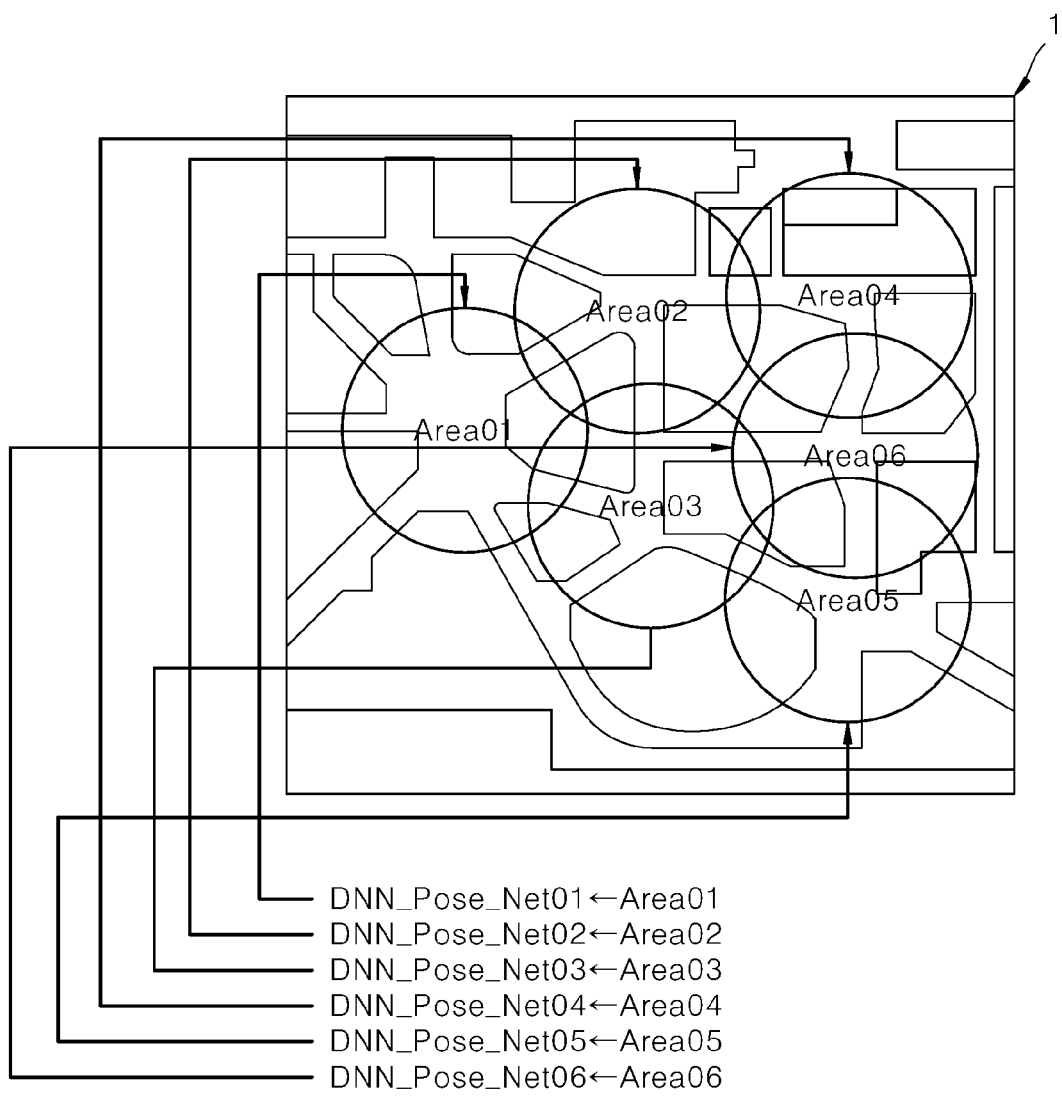
FIG. 1 shows example local areas according to an embodiment of the present disclosure.

FIG. 1 shows at least two example local areas according to an embodiment of the present disclosure. A robot or a cloud server divides a large indoor space into at least two predetermined local areas and learns respective deep learning networks used to estimate the respective positions in the respective local areas. The deep-learning based classifier that identify the local area selects the deep learning network used on the local area and finally estimates a current position of the robot through the selected deep learning network.

As shown in FIG. 1, a large area 1 where the robot moves is divided into a plurality of local areas (e.g., Area 01 to Area06). The robot or the cloud server classifies the local areas by dividing the large area into portions having various shapes, for example, circles and quadrangles. In this case, a first local area may partially overlap with a second local area.

In FIG. 1, the deep learning networks used by the robot are DNN_Pose_Net01 to 06, when the robot is located in the local areas. This is summarized in Table 1.

TABLE 1

| Current Position of Robot | Used Deep Learning Network |
|---|---|
| Area01 | DNN_Pose_Net01 |
| Area02 | DNN_Pose_Net02 |
| Area03 | DNN_Pose_Net03 |
| Area04 | DNN_Pose_Net04 |
| Area05 | DNN_Pose_Net05 |
| Area06 | DNN_Pose_Net06 |

As shown in FIG. 1, the robot or the cloud server classifies a target space into a plurality of local areas to acquire the position information. The robot or the cloud server learns a plurality of deep learning networks used to estimate the position and uses the deep learning networks on the divided local areas (e.g., the deep learning network used on the local area).

In some examples, the robot or the cloud server learns the deep learning network (e.g., the deep learning network used to identify the local area) such that the robot or the cloud server identifies the local area using the deep learning network which functions as a classifier that determines the local area in which the robot is located in the entire large area.

The robot or the cloud server determines the local area in which the robot is currently located through the deep learning network used to identify the local area. Subsequently, the robot or the cloud server matches the deep learning network learned to identify the position estimation for each local area and corresponding local area and identifies an accurate coordinate corresponding to the current position of the robot. The robot or the cloud server may use time-series deep learning networks to improve the accuracy. This configuration is described below in detail.

Figure 2:
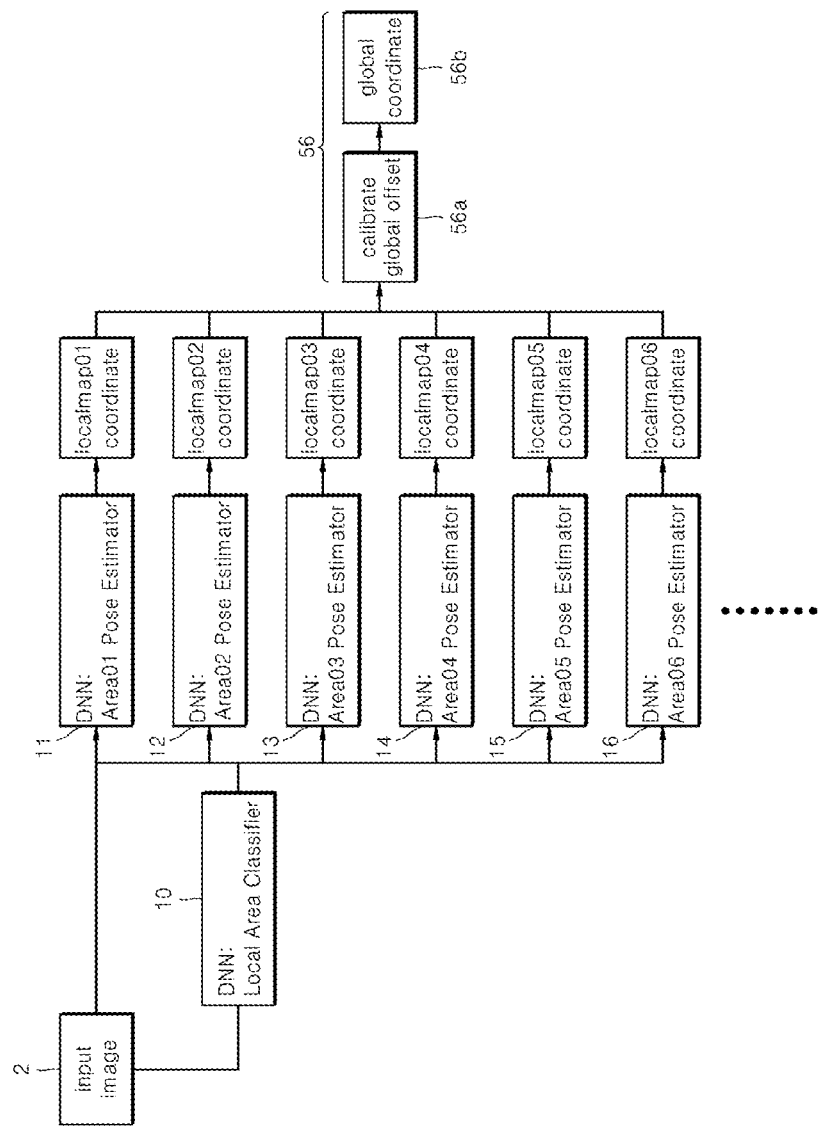
FIG. 2 is a block diagram showing an example hierarchical deep learning network according to an embodiment of the present disclosure.

FIG. 2 shows an example hierarchical deep learning network according to an embodiment of the present disclosure. A robot inputs an image 2 of surroundings into a deep neural network (DNN) 10, which functions as a local area classifier 256 (see FIGS. 3 and 4). The DNN 10, which functions as a local area classifier, determines whether the robot is currently located in at least one of the local areas in FIG. 1 using the input image.

The DNN 10, which functions as the local area classifier, outputs information indicating one local area based on the determination. Alternatively, the DNN 10 may output the information indicating at least two local areas at S4. The DNN 10 which functions as the local area classifier may output the information indicating the at least two local areas and priorities on the local areas to increase a speed of estimating the position.

It is assumed that one local area exemplified in S4 is Area02. In this case, an image 2 is input to the DNN 12 usable on Area02, which functions as a position estimator. The image is input to the deep learning network 12 to estimate the position in Area02 and the deep learning network 12 outputs a position of a local map (e.g., localmap02) corresponding to Area02 (S5b).

The robot or the cloud server corrects the position coordinate on the local map corresponding to Area02 to a global coordinate (S6). For example, the robot or the cloud server calibrates a local coordinate (e.g., a coordinate of a localmap02) corresponding to the position of the robot on the local map corresponding to Area02 using a global offset (S6a). The robot or the cloud server generates the global coordinate through the calibration (S6b).

The process of FIG. 2 is summarized as follows. The robot or the cloud server identifies the local area in which the robot is currently located using the input image, in large spaces, for example, indoor spaces in which GPS signals may not be received. The robot or the cloud server searches for a deep learning network used to determine the position coordinates within the identified local area.

The robot or the cloud server may input the image to the deep learning network found through the above process to determine the accurate position coordinate in the local area and to correct the local coordinate to the global coordinate to obtain the global coordinate of the robot.

In reference numerals 11 to 16 of FIG. 2, a deep learning network, which functions as a position estimator 257 (see FIG. 4) used on a specific local area calculate the local position using the image input only within the corresponding local area. In some examples, the deep learning network 10, which functions as the local area classifier, used to identify the local area in which the robot is located in the large space, may be different from the deep learning networks 11 to 16. The local area classifier may also be implemented with software or hardware within the robot or the cloud server.

A deep learning network used on the specific local area is referred to as "a position estimator". The local area classifier refers to the deep learning network learned to determine the local area in which the robot is located.

Figure 3:
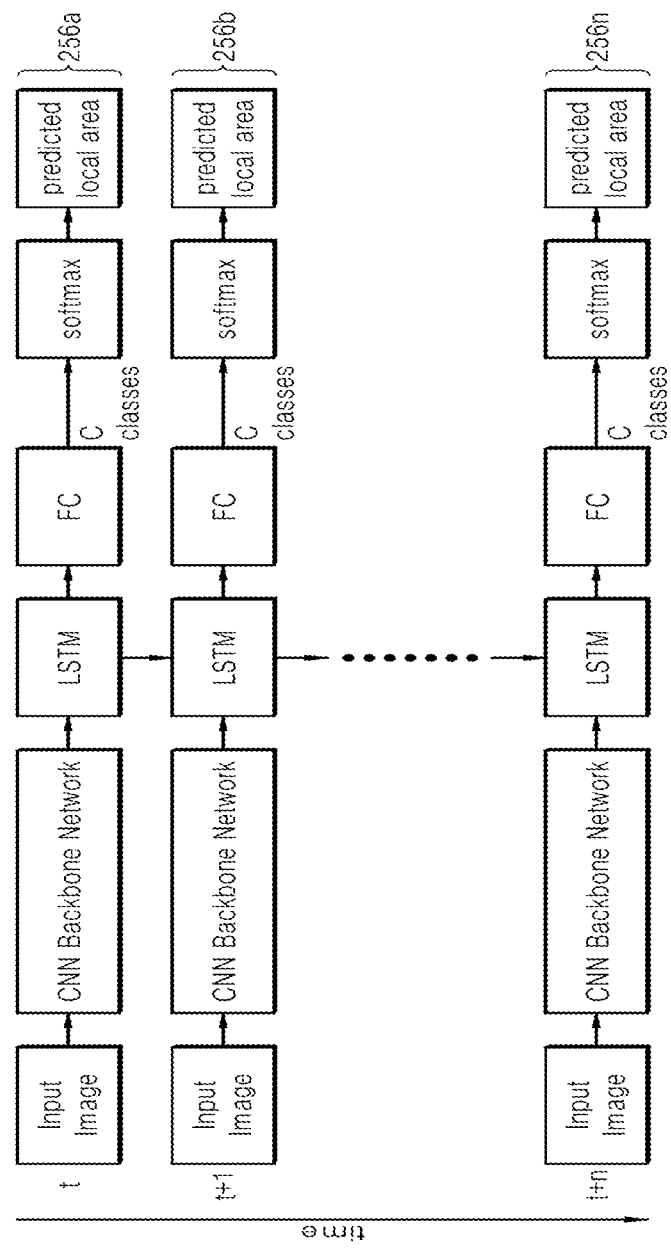
FIG. 3 shows an example local area classifier including a DNN used in time series according to an embodiment of the present disclosure.

FIG. 3 shows an example local area classifier using a time-series DNN according to an embodiment of the present disclosure. A local area classifier 256 includes a CNN backbone network, a long-short term memory (LSTM) layer, and a fully connected (FC) layer. The local area classifier is indicated by 256a at time point t and the local area classifier is indicated by 256b at a time point t+1, and the local area classifier is indicated by 256n at a time point t+n such that one local area classifier 256 operates in time series.

A component of the local area classifier is described in detail. Examples of the convolution neural network (CNN) backbone network of the local area classifier includes VGG, LeNet, ResNet, and YoLo. The CNN is a kind of artificial neural network used to recognize the image.

The CNN may include multiple layers. The CNN is a model that learns a convolution by dividing input image into portions and learns convolution of predetermined size. The CNN may include a convolutional layer and a pooling layer.

The local area classifier of the robot or the cloud server may combine the CNN backbone network with the long-short term memory (LSTM) layer and use time series data to improve accuracy in classification. In this case, the LSTM layer may remove previous position information within a predetermined range and reflect new input value using time series data to reflect time-dependent information.

The result generated by the LSTM is input to a fully connected (FC) layer, and a result output by the FC layer is input to Softmax. In this example, Softmax outputs a result generated by predicting whether the input image corresponds to at least one of the local areas.

For example, the process performed by the local area classifier improves the accuracy in classification based on the time series data using the convolution neural network (CNN) and LSTM layer. A number of final outputs of the FC layer is equal to a total number C of classified local areas. In some examples, a Softmax layer as a last layer receives scores of classified local areas as inputs and calculates a probability based on the scores to select the local area with a highest probability.

In FIG. 3, as the images input at time points are used as time series data, N numbers of consecutive frames are received at the place where the robot is located, and a last output value indicates a final local area in which the robot is estimated to be currently located.

As illustrated in FIG. 2, the robot or the cloud server inputs an image to a position estimator, which is a specific deep learning network corresponding to the indicated local area, among reference numerals 11 to 16, such that the robot or the cloud server may finally generate the current position of the robot.

In summary, the local area classifier generates a first prediction result using the first image input at the first time point, the local area classifier generates a second prediction result using the second image input at the second time point. The second time point follows the first time point.

The similarity between the local area identified by the local area classifier and the first local area corresponding to the first prediction result may be lower than or equal to the similarity between the identified local area and the second local area corresponding to the second prediction result, which signifies that the local area classifier outputs more accurate classification results as time accumulates.

When the embodiments are applied, one algorithm may not cover the entire area during the position estimation, thereby improving the accuracy in and increasing the speed of the position estimation. For example, the robot or the cloud server may selectively use at least one deep learning algorithm, on at least one local area, used to recognize the position and with high accuracy in position estimation, thereby improving the accuracy in the position estimation and increasing an execution speed to for position estimation in real time.

Even if the position of the robot is incorrectly estimated in the local area, a deviation range exists within the local area, thereby preventing generation of an incorrect coordinate. For example, the deviation is still within the local area even if the deviation range is extended to a maximum level. Therefore, the robot may not incorrectly estimate the position of the robot as the position far from the current position of the robot.

When embodiments of the present disclosure are applied, the accuracy in and the speed of the position estimation of the robot may be improved and increased in large areas, particularly, in indoor spaces in which GPS signals may not be received.

Figure 4:
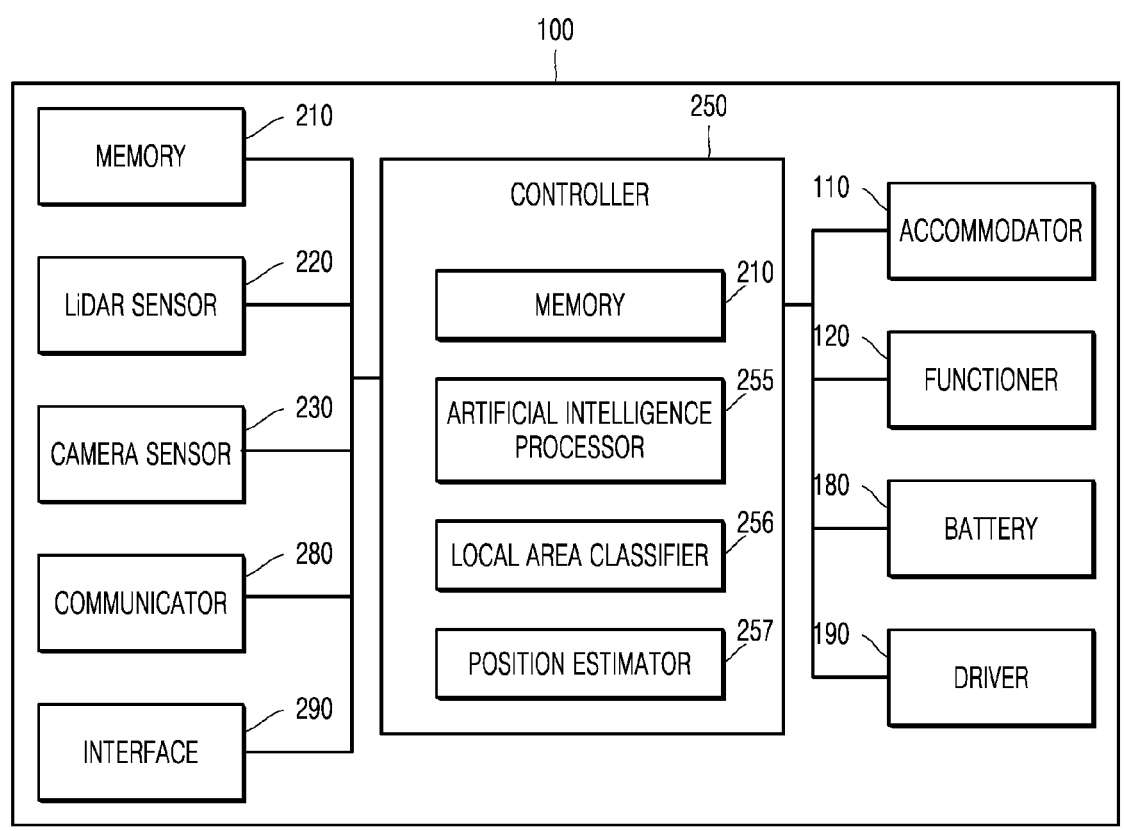
FIG. 4 is a block diagram showing example components of a robot according to an embodiment of the present disclosure.

FIG. 4 is a block diagram showing example components of a robot according to an embodiment of the present disclosure. In the configuration of the robot in FIG. 4, a cloud server may also perform a function of a controller 250.

The robot may move in a large indoor space and may perform a predetermined function (e.g., delivery, cart, accommodation, guidance, security, and the like). In particular, in large indoor spaces, the robot may acquire accurate position information to perform functions such as delivery, security, guidance, and memory.

The robot (in FIG. 4) acquires local area information on the local area where the robot is currently located while moving in the large indoor space and acquires the position information based on local area information to select a deep learning network, and acquires the accurate position information of the robot within the local area. The robot may also calculate the position of the robot using the global coordinate based on the position information of the robot in the local area.

A robot 100 may (or may not) include an accommodator 110. The accommodator 110 defines a space in which objects are accommodated or stacked by a user. In some examples, the robot may include the accommodator 110 and may move while following users. Alternatively, the accommodator 110 may be mounted on the robot 100 to load objects such that the robot 100 performs the delivery function. In some examples, the delivery robot 100 may unload the objects at a designated position or may load objects disposed outside into the accommodator 110. The products may be automatically loaded onto or unloaded from the accommodator 110 or the accommodator 110 may change a loading sequence of the one or more products.

A functioner 120 performs a predetermined function assigned to the robot. The functioner 120 of a robot that performs a cleaning function includes a damp cloth and a suctioner for cleaning. The functioner 120 of a robot for delivery includes an accommodation space and a transporter that moves accommodated luggage. The functioner 120 of a robot for security includes a tester (e.g., a tester that performs air quality inspection, explosives inspection, and the like) required for safety.

The battery 180 provides electrical energy required for the robot 100 to operate. The driver (i.e., moving unit or mover) 190 performs a moving function of the robot.

The robot may include a driver 190 including an actuator or a motor to perform various kinds of physical operation such as moving joints of a robot. In some examples, the movable robot includes a driver and the driver includes wheels, a brake, a propeller, and the like, and may travel on the ground or fly in the air through the driver.

The robot may also perform autonomous driving. Autonomous driving refers to self-driving technology, and the autonomous robot travels without manipulation of users or with minimum level of manipulation of users. For example, autonomous driving may include technology for maintaining a predetermined distance with an obstacle in a space in which the robot travels, technology for automatically adjusting speed of the robot such as adaptive cruise control, technology for automatically driving along a predetermined path of the robot, and technology for automatically setting a path of a robot based on set destination of a robot to travel. The robot may include an internal combustion engine or an electric motor for autonomous driving and the internal combustion engine and the electric motor are sub-components of the driver 190.

The robot 100 includes a controller 250 that controls the above-described components. The controller 250 may further include an artificial intelligence processor 255.

The controller 250 also controls the memory (i.e., storage unit) 210, the LiDAR sensor 220, a camera sensor 230 (or a camera), and a communicator 280 (or communication device) as components of the robot.

The memory 210 stores two or more pieces of local area information on the local area used to divide the large indoor space in which the robot moves and the deep-learning network mechanism used to acquire the position information on the position in the local area. The memory 210 may be a subcomponent of the controller 250. For example, the controller 250 may include the memory 210 as one memory.

The memory 210 may store the local area information on the local area determined by the local area classifier and the position estimator. The memory 210 may also store the entire map of the space in which the robot moves, or store information on classified entire map into at least two local areas.

The controller 250 may load the local area identifier and the position estimator stored in the memory 210 to perform the process of estimating the position during the movement. The local area identifier and position estimator may be stored in forms of software in the memory 210.

A LiDAR sensor 220 may sense nearby objects in two dimensions or in three dimensions. The two-dimensional (2D) LiDAR sensor may sense the position of an object in a range of 360 degrees or less with respect to the robot. LiDAR information obtained through the sensing at a specific position is an example sensor data.

Alternatively, the sensor data obtained by the LiDAR sensor 220 may be referred to as "a LiDAR frame". For example, the LiDAR sensor 220 senses a distance between a robot and an object disposed outside the robot to generate the LiDAR frame.

In an embodiment, a camera sensor 230 is a general camera. Two or more camera sensors 230 may be used to overcome limitations on viewing angles. Images photographed at a specified position form image information. For example, in an embodiment, image information generated by capturing (i.e., photographing by the camera sensor 230), an object disposed outside the robot is example sensor data. Alternatively, the sensor data obtained by the camera sensor 230 may be referred to as "a visual frame". For example, the camera sensor 230 photographs the outside of the robot and generates the visual frame.

According to the present disclosure, the robot 100 performs simultaneous localization and mapping (SLAM) using any one or both of the LiDAR sensor 220 and the camera sensor 230. During the SLAM process, the robot 100 may perform map generation or position estimation using the LiDAR frame and the visual frame independently or in combination.

The interface 290 receives information from a user. Various pieces of information such as touch input and voice input are received from the user and the result thereof is output. The interface 290 may also output a sound to inform people that the robot 100 is approaching while moving. For example, the interface 290 may provide external people with predetermined visual or auditory information. For example, the interface 290 may receive voice commands from external people or may receive input through a touch screen.

The controller 250 acquires local area information on the local area where the robot is located in the indoor space, loads the position estimator set to be used on the determined local area, and inputs the information acquired by a sensor (e.g., a LiDAR sensor and/or a camera sensor) to the position estimator. Accordingly, the accurate position information of the robot is generated. The controller 250 controls the driver 190 that moves the robot under the control of the controller 250.

The controller 250 may also include a wheel encoder. The wheel encoder generates wheel odometry information by collecting rotation or direction information on rotation or direction of wheels of the mover of the robot. The controller 250 may calculate a moving distance or a moving direction of the robot based on the information generated by the wheel encoder.

A communicator 280 allows the robot 100 to communicate with another robot or an external cloud server to transmit and receive information. The communicator 280 may also acquire information on an external communication environment such that the robot 100 identifies the local area.

For example, the communicator 280 may be disposed in the indoor space and may receive the signal from a transmitter that outputs a signal. For example, an indoor space may have a plurality of stores or offices, and these stores or offices may use Wi-Fi. In this example, the communicator 280 acquires Wi-Fi identification information and the controller 250 may improve the accuracy in estimation of the local area in which the robot is currently located or the current position of the robot based on the acquired information. An artificial intelligence processor 255 of the controller 250 includes a local area classifier 256 and a position estimator 257 that operate based on the deep learning.

The configuration of FIG. 4 is described as follows. A camera sensor 230 captures a space in which the robot 100 moves. The controller 250 includes a local area classifier 256 and a position estimator 257 that operate based on the deep learning as a software component or a hardware component.

The local area classifier 256 identifies one of a plurality of local areas in the space in which the robot moves. The controller 250 inputs the image photographed by the camera sensor 230 to the local area classifier 256, and the local area classifier 256 identifies the local area in which the robot is located using the input image.

The position estimator 257 estimates the position of the robot in each of the local areas and the controller 250 may include a plurality of position estimators 257. The controller 250 selects a position estimator 257 used on the identified local area, inputs an image photographed by a camera sensor to the selected position estimator 257, and generates the position information on the position in the local area.

When the generation of the position information in the local area is completed, the controller 250 may calculate the global coordinate based on the local area.

Figure 5:
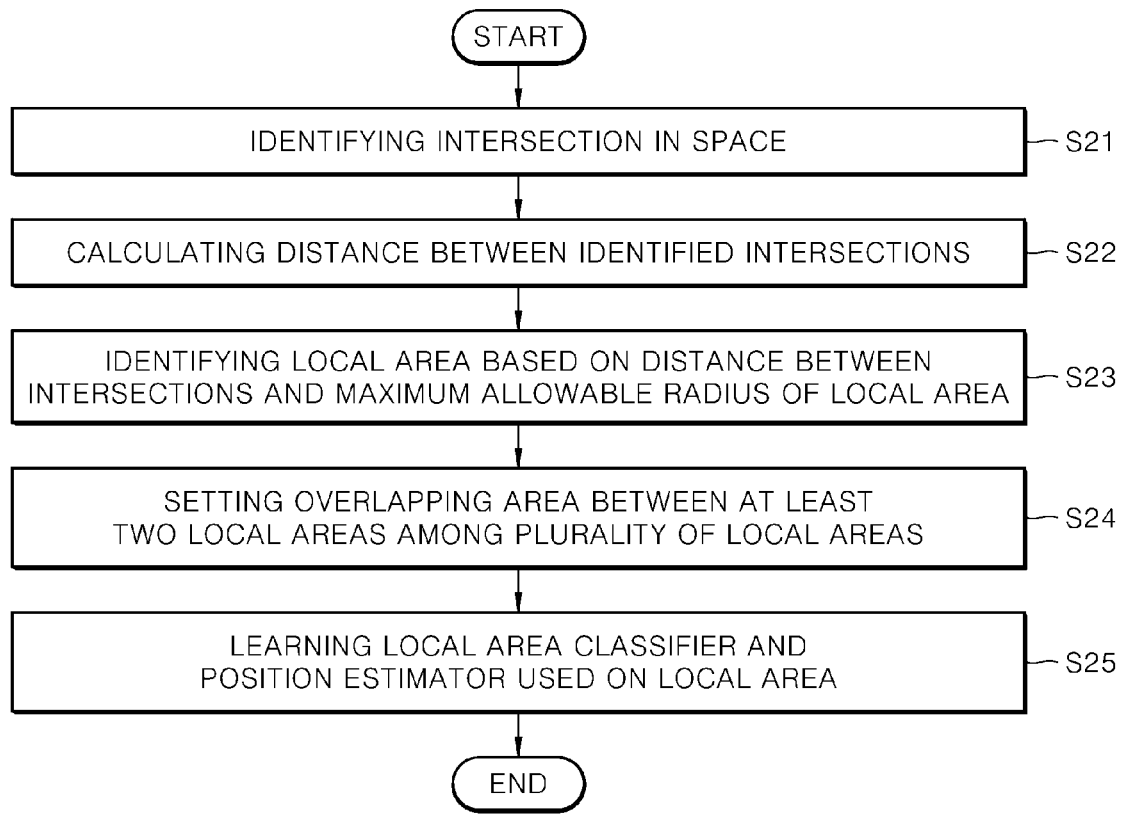
FIG. 5 is a process flow diagram showing an example method for dividing an indoor space into at least two local areas according to an embodiment of the present disclosure.

FIG. 5 is a process flow diagram showing an example method for dividing an indoor space into local areas according to an embodiment of the present disclosure. In one embodiment, a robot or a cloud server may determine an intersection to divide the indoor space where a lot of stores or offices are located into at least two local areas. For example, the robot or the cloud server may determine the local area based on the intersection. The robot is described below, but embodiments may also be applied to a cloud server. In this case, the cloud server uses sensor data sensed by the robot.

A controller 250 of the robot 100 identifies an intersection where main streets cross in the indoor space (S21). The controller 250 of the robot 100 may identify the intersection using previously drawn map of the indoor space or an image including a guide map of the indoor space. Alternatively, the controller 250 may identify the intersection during the movement of the robot 100.

According to an embodiment, the camera sensor 230 of the robot 100 may capture a street extending in a direction of a straight line that connects stores at both ends in the street where the robot moves and may capture an intersection branched at an end of that street. The controller 250 of the robot 100 may determine the intersection through image processing and object analysis in the image.

The controller 250 of the robot 100 calculates a distance between at least two intersections of the plurality of intersections identified during the driving or using the map or the image (S22).

Based on the calculation, the controller 250 classifies the local area based on the distance between the at least two intersections and a maximum allowable radius of the local area (S23). The maximum allowable radius of the local area refers to a maximum size of the local area determined such that the deep learning network efficiently acquires the position information.

In the case where the local area is determined beyond the maximum allowable radius, the robot may incorrectly estimate the position of the robot in the local area or a time for estimating the position of the robot may take too long. The maximum allowable radius may be variously set according to computing resources that may be processed by a robot or cloud server, characteristics of spaces, a number of robots, or density of stores.

The controller 250 of the robot sets at least one overlapping area between the at least two set local areas. As the local area determined by the local area classifier 256 may not be identical to the local area in which the robot is located in the case where the robot is located close to a boundary area corresponding to the overlapping area of the local areas, the overlapping area which is the boundary area is set such that the at least two deep learning networks may cover the at least two local areas (S24).

The robot or the cloud server learns the local area classifier and the position estimator used on each local area using the image acquired in the set local area (S25). In this case, sensor information acquired by sensors other than the camera sensor may also be input during the learning to improve the accuracy.

Figure 6:
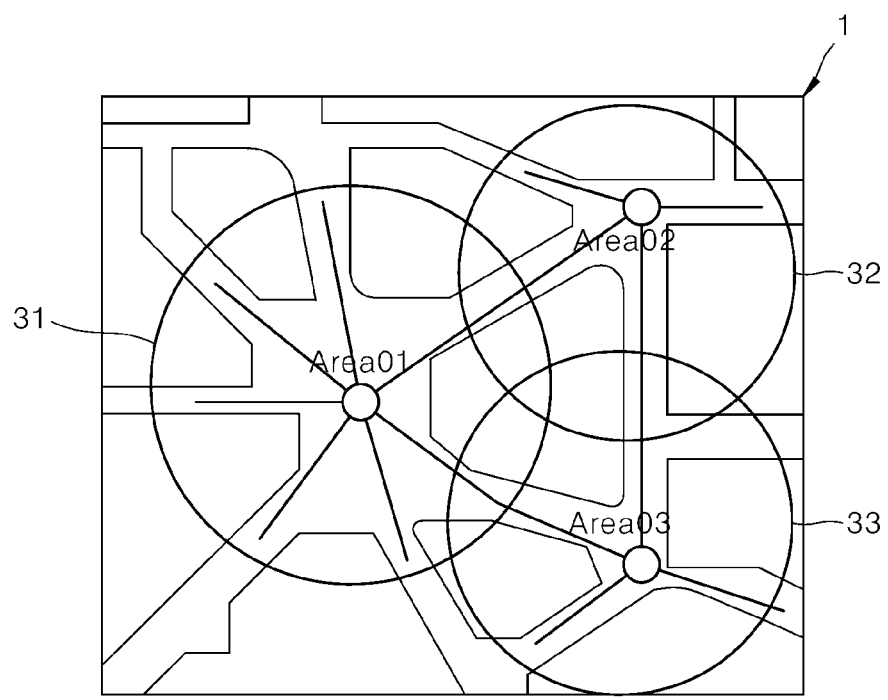
FIG. 6 shows an example large space divided into at least two local areas according to an embodiment of the present disclosure.

FIG. 6 shows example large space divided into at least two local areas according to an embodiment of the present disclosure. A robot may directly drive in a large area to acquire position information on intersections and surrounding areas. Alternatively, the robot may acquire position information related to the intersection and the surrounding area using a pre-provided map of the large area.

In a large area 1, the robot identifies the intersection as represented by thick lines. FIG. 6 shows three identified intersections. A center point of each of the intersections is represented by a circle. A controller 250 of the robot 100 sets local areas 31, 32, and 33 in FIG. 6 based on a distance between at least two center points of at least two intersections and a number of paths crossing at the intersection.

A first local area Area01 indicated by reference numeral 31 overlaps a second local areas Area02 indicated by reference numeral 32. The first local area 31 (Area01) overlaps a third local area Area03 indicated by reference numeral 33. Similarly, the second local area Area02 indicated by reference numeral 32 overlaps the third local areas Area03 indicated by reference numeral 33. The robot or the cloud server learns the local area classifier 256 and the position estimator that performs functions on each of the local areas.

As illustrated in FIGS. 5 and 6, the robot or the cloud server may set a local area at a place where the intersection is present indoors. In some examples, a size of the local area may vary depending on environmental factors such as size of stores or a floating population in the space, and a computing power of the robot.

In the space in which the stores have large sizes or the stores are easily identified, the size of the local area is increased such that the position estimator used on the local area covers a wide range to perform the position estimation. In the space in which the stores have small sizes or the stores are not easily identified, the size of the local area is decreased such that the position estimator used on the local area may cover a narrow range to perform the position estimation. The size of the local area may be variously set within one large space.

In some examples, the robot or the cloud server learns the deep learning network of the position estimator or the local area classifier 256 used on the local area by allowing adjacent local areas to overlap each other. When the local areas are overlapped with each other, the local area and the position may be accurately estimated when the robot moves from a first local area to a second local area.

FIG. 5 or 6 is summarized as follows. The controller 250 identifies the intersection using an image photographed during movement of the robot or a pre-stored map (S21). The controller 250 calculates the distance between the identified center points of the intersections and divides the space in which the robot moves into local areas having center points of intersections or local areas including an overlapping area between the at least two intersections (S22 to S24). In this case, the local area may include an overlapping area overlapping with the adjacent local area.

Subsequently, the local area classifier 256 receives the image collected in the local area and learns about the local area (S25). In some examples, the position estimator also performs the learning on the local area (S25). The process of FIG. 5 or FIG. 6 may be performed by a mapper robot or the cloud server.

Figure 7:
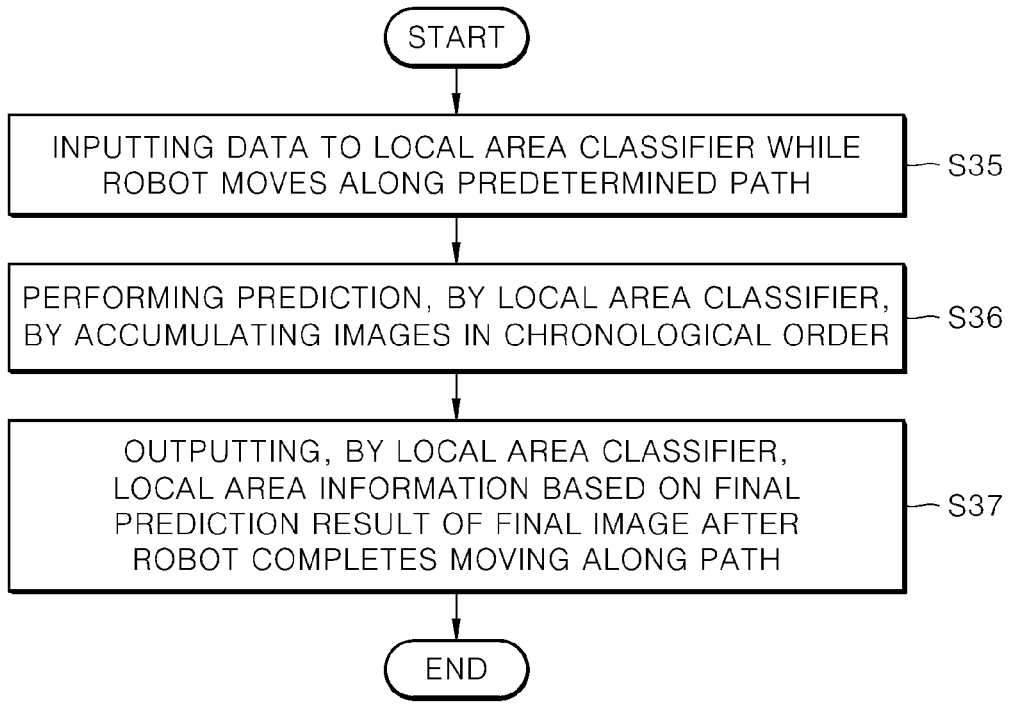
FIG. 7 is a process flow diagram showing an example method for identifying a local area by a robot according to an embodiment of the present disclosure.

FIG. 7 is a process flow diagram showing an example method for identifying, by a robot, local areas according to an embodiment of the present disclosure. The robot acquires an image frame while moving within a predetermined range to acquire local area information on the local area in which the robot is currently located. For example, the robot moves along a closed loop path and the camera sensor 230 generates an image frame. In this case, the closed loop may have a closed curve of a predetermined size. When the robot is located in the center of an intersection or located near to the intersection, the robot may generate the closed-loop path including the intersection area and may move along that path.

Alternatively, the robot may move in a forward and rearward direction or in a leftward and rightward direction along the road to obtain an image frame at a non-intersection. In this case, the robot may rotate the camera sensor 230 in a 360-degree direction, or the robot 100 may directly rotate 360 degrees to photograph images in all directions.

The controller 250 of the robot inputs the acquired image frame to the local area classifier 256 (S35). As shown in FIG. 3, an image is acquired in time series according to the movement of the robot. Accordingly, as shown in FIG. 3, an image is input at time point t to generate a first result of prediction of the local area.

Subsequently, the image is input at the time point t+1 and a second result of prediction of the local area is generated. This operation is repeatedly performed until the robot completes the movement along the path. For example, the robot repeatedly inputs the image accumulated during the movement of the robot to the local area classifier 256. The local area classifier 256 accumulates the images in chronological order and performs the prediction of the local area (S36).

When the movement of the robot along the path is completed, the local area classifier 256 outputs local area information based on a last prediction result of the image (S37). In this case, the local area information may indicate one local area. Alternatively, the local area information may indicate a plurality of local areas.

In the case where the local area classifier 256 outputs a plurality of local areas, the local area classifier 256 may also output at least one probability of at least one local area. For example, the local area classifier 256 may output probabilities of a total of six local areas as shown in Table 2 below.

TABLE 2

| Predicted Local Area | Probability |
|---|---|
| Area01 | 20% |
| Area02 | 75% |
| Area03 | 5% |
| Area04 | 0% |
| Area05 | 0% |
| Area06 | 0% |

As shown in Table 2, when the local area classifier 256 outputs at least one probability of at least one local area, the controller 250 may determine that the robot is located in "Area02" with a highest probability among Area01 to Area06.

Alternatively, the controller 250 may select a specific local area based on results generated using the previous position information of the robot, as shown in Table 2. Referring to FIG. 1, it is assumed that the robot was previously located in Area04. In this case, the local area to which the robot may move from Area 04 corresponds to Area02 and Area06.

As shown in Table 2, as a probability of Area06 is 0% and a probability of Area02 is 75%, the controller 250 may determine that the robot is currently located in Area02. The controller 250 of the robot inputs an image to DNN_Pose_Net02 to calculate the local coordinate of the robot within Area02. The controller 250 of the robot generates a global coordinate based on information on local coordinates and Area02.

For example, when the local area classifier 256 outputs two or more local areas as shown in Table 2, the controller 250 may select one from two or more output local areas based on the local area information on the local area where the robot 100 is previously located or the probability of each of the at least two output local areas.

When the position estimator generates the information on the position within the local area after the controller 250 selects the local area, if the position estimator does not output the position information, the controller 250 may select one of the local areas which are not previously selected.

Figure 8:
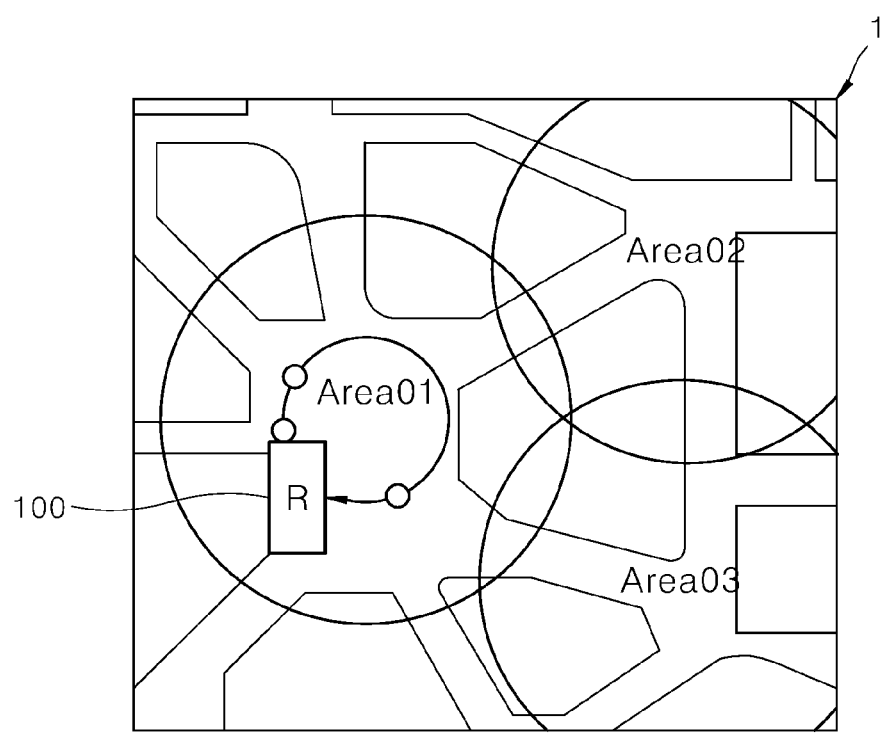
FIG. 8 shows an example process of moving a robot to identify at least one local area according to an embodiment of the present disclosure.

FIG. 8 shows an example robot that moves to identify a local area according to an embodiment of the present disclosure. In FIG. 8, a robot 100 (R) moves along an arrow path. A camera sensor 230 of the robot 100 photographs images at a time point t, a time point t+1, . . . , a time point t+n.

The photographed images are input to the local area classifier 256. The local area classifier 256 learns images photographed at time point t, time point t+1, and time point t+n and outputs local area information on the local area predicted at a final time point t+n. The result output by the local area classifier 256 may correspond to information on the local area.

Alternatively, the result output by the local area classifier 256 may correspond to information on at least two local areas. The controller 250 identifies the current position of the robot based on the output information and executes the position estimation on each local area.

The robot may not necessarily move along a closed-loop path. For example, the robot may move in a forward and rearward direction or in a leftward or rightward direction to photograph surroundings in all directions of 360 degrees and may predict the local area using the photographed image. In particular, the LSTM of the local area classifier 256 outputs the result generated by accumulating the features of consecutive images, thereby improving the accuracy in identification of the local area.

FIG. 8 is summarized as follows. The robot moves while forming a path having the closed loop at the intersection based on determination that the robot 100 is currently located at the intersection, by the controller 250. In this process, the camera sensor 230 photographs the surroundings.

The local area classifier 256 identifies the local area in which the robot is currently located using the photographed images.

Figure 9:
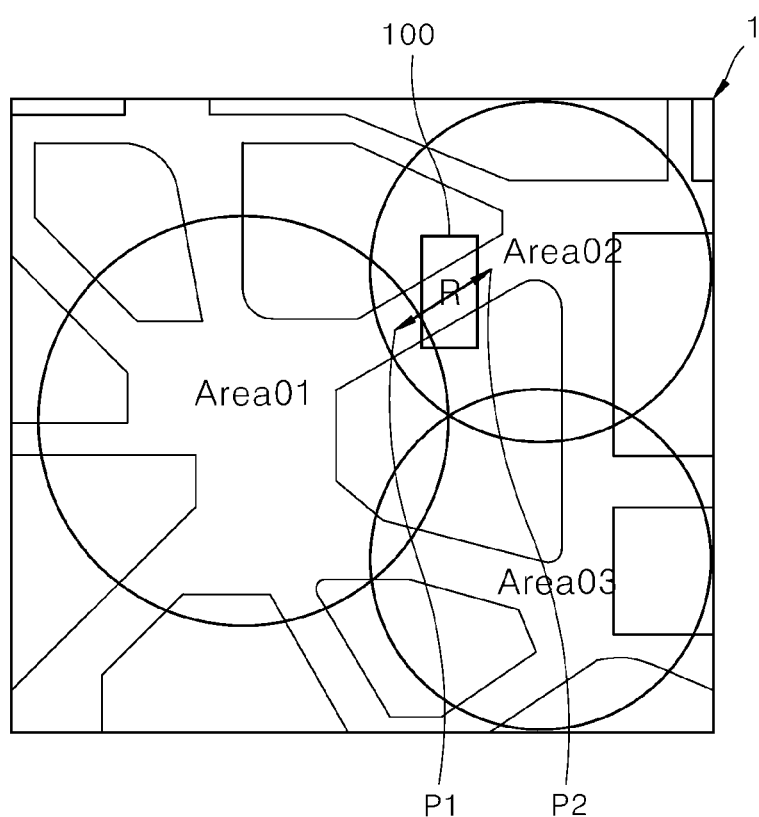
FIG. 9 shows an example process of moving a robot to identify at least one local area according to an embodiment of the present disclosure.

FIG. 9 shows an example process of moving a robot to identify local areas according to an embodiment of the present disclosure. In FIG. 9, a robot 100 (R) moves along a path between P1 and P2 indicated by a double headed arrow. A camera sensor 230 of the robot 100 photographs an image at a time point t, a time point t+1, . . . , a time point t+n.

The photographed image is input to a local area classifier 256. The local area classifier 256 learns images photographed at the time point t, the time point t+1, and the time point t+n, and outputs local area information on the local area predicted at a final time point of t+n. The result output by the local area classifier 256 may correspond to information on at least one local area. Alternatively, the result output by the local area classifier 256 may correspond to information on at least two local areas.

FIG. 9 shows an example robot 100 not located at an intersection, in contrast to FIG. 8. For example, the controller 250 determines whether the robot is currently located at an intersection, and if not, the robot moves from a first position P1 which is a current position of the robot to a second position P2 and returns back to the first position P1 (in a direction indicated by the double headed arrow).

In this process, a camera sensor 230 may photograph surroundings. Alternatively, the camera sensor may photograph the surroundings while rotating when the robot 100 is located at the first position p1. The local area classifier 256 identifies the local area in which the robot is currently located using the photographed images.

Figure 10:
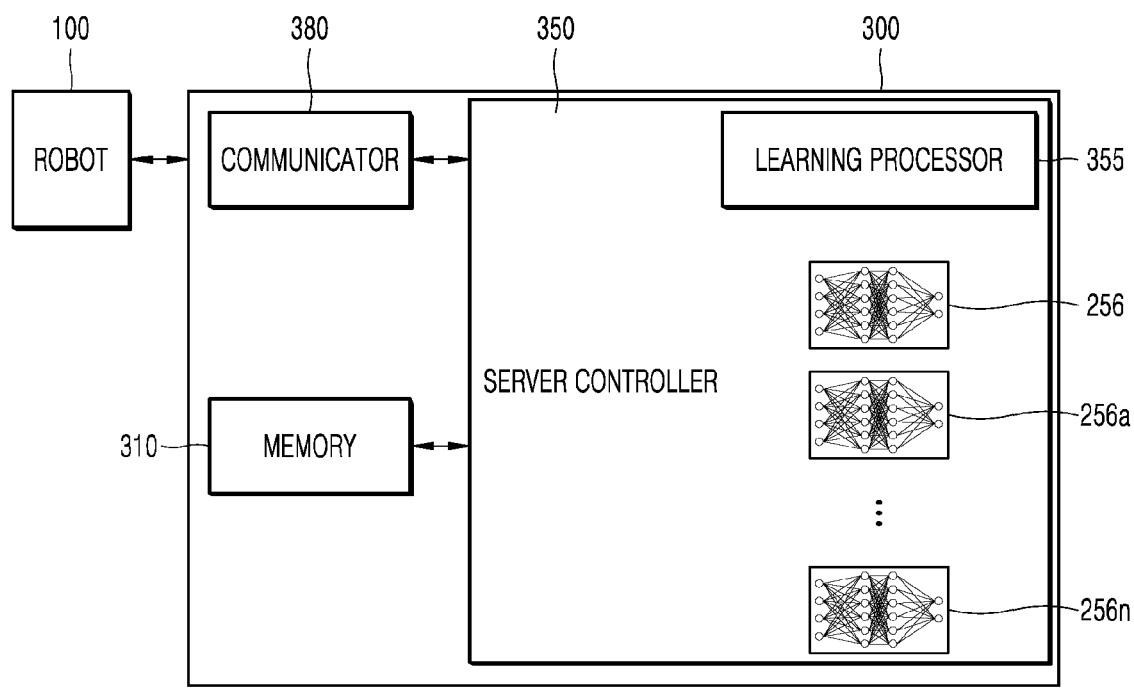
FIG. 10 is a block diagram showing example components of a cloud server according to an embodiment of the present disclosure.

FIG. 10 is a block diagram showing example components of a cloud server according to an embodiment of the present disclosure. A cloud server 300 includes a communicator 380 that communicate with the robot 100, a memory 310, and a server controller 350. The memory 310 may be included in the server controller 350.

The configuration of the server controller 350 is similar to that of the controller 250 of the robot 100 in FIG. 4. When the cloud server 300 performs a function of the artificial intelligence processor 355 (or learning processor), the cloud server 300 may be referred to as "an artificial intelligence server." The artificial intelligence processor 355 of the cloud server or the artificial intelligence processor 255 of the robot 100 provides a deep learning network of the local area classifier 256 and the position estimator 257 (e.g., the position estimators 257a to 257n) used on the local area.

The communicator 380 of the cloud server 300 receives, from the robot 100, a captured (i.e., photographed) image of the space in which the robot moves. The server controller 350 of the cloud server 300 may include at least one of a local area classifier 256 that identifies one of the plurality of local areas of the space or a plurality of position estimators 257a to 257n that estimate the position of the robot in the local area. When the calculation of the robot 100 is performed slowly, the local area classifier 256 and the position estimators 257a to 257n of the cloud server 300 identify the local area of the robot and generate global coordinates. If the robot can obtain computing power for performing the calculation using the artificial intelligence, the robot 100 may identify the local area and generate the global coordinate of the robot without communication with the cloud server 300.

The function distribution between the robot 100 and the cloud server 300 may vary depending on a communication speed between the robot 100 and the cloud server 300 and a processing performance of the robot 100.

The server controller 350 generates identification information of the local area corresponding to the image received by the communicator 380 or position information related to the local area. The communicator 380 transmits, to the robot, identification information of the local area or the position information on the position in the local area.

As the local area classifier 256 and the position estimators 257a to 257n of the cloud server 300 are identical to those of the robot 100, the foregoing description is referred to.

The artificial intelligence processors 255 of the robot 100 or the artificial intelligence processor 355 of the cloud server 300 is described briefly. Artificial intelligence refers to a field of researching artificial intelligence or researching methodologies for creating artificial intelligence, and machine learning refers to a field of defining various problems in the field of artificial intelligence and researching methodologies for solving the problems. The machine learning is defined as an algorithm that improves the performance of a task through consistent experiences with the task.

An artificial neural network (ANN) is a model used in machine learning and may refer to any kind of model having a problem-solving capability, the model including artificial neurons (nodes) forming a network by a combination of synapses. The ANN may be defined by a connection pattern between neurons in different layers, a learning process for updating model parameters, and an activation function for generating an output value.

The ANN may include an input layer and an output layer. Optionally, the ANN may further include one or more hidden layers. Each layer may include one or more neurons, and the ANN may include synapses for connecting the neurons. In the ANN, each neuron may output function values of the activation function associated with input signals, weights, and deflections that are received through the synapses.

The model parameters refer to parameters determined through learning and include synapse connection weights, neuron deflections, and the like. In some examples, hyperparameters refer to parameters to be set before learning in a machine learning algorithm and includes a learning rate, the number of repetitions, a size of mini-batch, an initialization function, and the like.

The training purpose of the ANN may be regarded as determining model parameters to minimize a loss function. The loss function may be used as an index for determining an optimal model parameter during the learning process of the ANN.

The machine learning may be classified as supervised learning, unsupervised learning, or reinforcement learning depending on the learning scheme. The supervised learning may refer to a method of training the ANN while a label for learning data is given, and the label may refer to an answer (or a result value) to be inferred by the ANN when the learning data is input to the ANN. The unsupervised learning may refer to a method of training the ANN while the label for the learning data is not given. The reinforcement learning may refer to a learning method for training an agent defined in any embodiment to select an action or a sequence of actions that maximizes cumulative reward in each state.

Machine learning implemented using a deep neural network (DNN) including a plurality of hidden layers in the ANN is called deep learning, and the deep learning is a portion of the machine learning. In the following description, the machine learning is used as a meaning including the deep learning.

For the robot 100, the artificial intelligence processor 255, which is a sub-component of the controller 250 that has been described above, may perform an artificial intelligence function. The artificial intelligence processor 255 of the controller 250 may be implemented with software or hardware. Alternatively, artificial intelligence processor 355, which is the sub-component of server controller 350 of the cloud server 300, may perform an artificial intelligence function.

In this case, the communicator 280 of the robot 100 may transmit or receive data to or from external apparatuses such as the cloud server 300, which is described in FIG. 10, or a robot that performs another artificial intelligence function through wired and wireless communication technologies. For example, the communicator 280 may transmit or receive sensor information, user inputs, learning models, controls signals, and the like to or from external apparatuses.

In this case, the communication technology used by the communicator 280 includes global system for mobile communication (GSM), code-division multiple access (CDMA), long term evolution (LTE), 5G, Wireless LAN (WLAN), Wireless-Fidelity (Wi-Fi), Bluetooth, radio-frequency identification (RFID), infrared data association (IrDA), ZigBee, near field communication (NFC), and the like.

The interface 290 may acquire various kinds of data. In this case, the interface 290 may include a camera that receives an image signal input, a microphone that receives an audio signal, a user input that receives information from a user, and the like. Information acquired by the LiDAR sensor 220, the camera sensor 230, or the microphone refers to sensing data, sensor information, and the like.

The interface 290, various types of sensors, the wheel encoder 260 of the mover, and the like may acquire input data or the like to be used when an output is acquired using a learning model and learning data for learning a model. The aforementioned components may acquire raw input data. In this case, the controller 250 or the artificial intelligence processor 255 may extract an input feature as a preprocessing process for the input data.

The artificial intelligence processor 255 may train a model including an ANN using learning data. The trained ANN may be called a learning model. The learning model may be used to infer a result value not for the learning data but for new input data, and the inferred value may be used as a determination basis for the robot 100 to perform a certain operation.

In this case, the artificial intelligence processor 255 of the robot 100 may perform artificial intelligence processing along with the artificial intelligence processor 355 of the cloud server 300. In this case, the artificial intelligence processor 255 of the robot 100 may include a memory integrated or implemented within the robot 100. Alternatively, the artificial intelligence processor 255 of the robot 100 may be implemented with an additional memory, an external memory coupled to the robot 100, or a memory of an external apparatus.

The robot 100 may acquire at least one of internal information related to the robot 100, environmental information related to the robot 100, or user information using various types of sensors. Examples of the sensors included in the robot 100 include a proximity sensor, an illuminance sensor, an acceleration sensor, a magnetic sensor, a gyro sensor, an inertia sensor, an RGB sensor, an IR sensor, a fingerprint recognition sensor, an ultrasonic sensor, an optical sensor, a microphone, a LiDAR sensor, an obstacle sensor, a camera sensor, and a radar.

The interface 290 generates an output associated with a visual sense, an auditory sense, or a haptic sense. The interface 290 includes a display that outputs visual information, a speaker that outputs auditory information, and a haptic portion that outputs haptic information.

A memory built in the robot 100 may store data to support various types of functions of the robot 100. For example, the memory may store input data, learning data, a learning model, a learning history, and the like which are acquired by the interface 290 or various types of sensors built in the robot 100.

The controller 250 may determine at least one executable operation of the robot 100 based on information determined or generated using a data analysis algorithm or a machine learning algorithm. In some examples, the controller 250 may control components of the robot 100 to perform the determined operation. To this end, the controller 250 may request, retrieve, receive, or utilize data of the artificial intelligence or the memory and may control the components of the robot 100 to execute a predicted operation or an operation determined as being desirable among the at least one executable operation.

In this case, when there is a need for connection to an external apparatus in order to perform the determined operation, the controller 250 may generate a control signal for controlling the external apparatus and transmit the generated control signal to the external apparatus.

The controller 250 may acquire intention information with respect to a user input and may determine user's requirements based on the acquired intention information. The controller 250 may acquire intention information corresponding to a user input using at least one or more of a speech-to-text (STT) engine for converting a speech input into text or a natural language process (NLP) engine for acquiring intention information in a natural language.

At least one of the STT engine or the NLP engine may be constituted by an ANN in accordance with a machine learning algorithm. At least one of the STT engine or the NLP engine may be an engine which has learned by the artificial intelligence, an engine which has learned by the artificial intelligence processor 355 of the cloud server 300 that performs a function of the artificial intelligence server, or an engine which has learned by distributed processes thereof.

In some examples, the controller 250 may extract a feature point from sensor data acquired in real time, such as image sensor data or LiDAR sensor data. To this end, the artificial intelligence processor 255 may include an ANN that is trained according to the machine learning algorithm. In some examples, the artificial intelligence processor 255 of the robot 100 is trained, but trained by the artificial intelligence processor 355 of the cloud server 300 or through distributed processing therebetween.

The controller 250 may collect history information including operations of the robot 100, user feedback regarding the operations, and the like and may store the history information in the memory or the artificial intelligence processor 255 or transmit the history information to an external apparatus such as the cloud server 300. The collected history information may be used to update the learning model.

The cloud server of FIG. 10 may operate as the artificial intelligent server. The cloud server 300 that performs a function of an artificial intelligence server, i.e., an AI server may refer to an apparatus that trains an ANN using a machine learning algorithm or an apparatus that uses a trained ANN. The cloud server 300 may include a plurality of servers to perform distributed processing and may be determined as a 5G network.

The cloud server 300 includes the communicator 380, the server controller 350, and the artificial intelligence processor 355 and the components of the cloud server 300 are shown in FIG. 10. The cloud server 300 may further include a memory.

The memory may store the local area classifier 256 and the position estimators 257a to 257n including the model (or the ANN) being learned or learned through the artificial intelligence processor 355.

The artificial intelligence processor 355 (or learning processor) may train the artificial intelligence network based on learning data. The learning model may be used while being provided in the cloud server 300 of the ANN or while provided in an external apparatus such as the robot 100.

The learning model may be implemented with hardware, software, or a combination thereof. In the case where a portion or all of the learning model is implemented with software, one or more instructions to form the learning model may be stored in the memory 330.

The server controller 350 may infer a result value for new input data using the learning model and may generate a response or a control command based on the inferred result value.

The robot 100 may use the AI technology and may include a guide robot, a transport robot, a cleaning robot, a wearable robot, an entertainment robot, a pet robot, an unmanned flying robot, and the like.

The robot 100 may include a robot controller that controls an operation and the robot controller may refer to software or a hardware chip. The robot 100 may obtain state information of the robot 100a based on the sensor information obtained from various types of sensors or may detect (or recognize) the surrounding environment and an object or may generate map data or may generate a moving path and driving plans or may determine a response to user interaction, or may determine the operation. The robot 100 may use sensor information acquired by at least one sensor among a LiDAR, a radar, or a camera to determine the moving path and the driving plans.

The robot 100 may perform the operations using the learning model including at least one ANN. For example, the robot 100 may recognize a surrounding environment and the object using the learning model and may determine the operation using the recognized surrounding environment information or object information. The learning model may be directly learned by the robot 100 or may be learned by an external device such as a cloud server 300.

In this case, the robot 100 may perform the operation by generating a result using the learning model and may also perform the operation by transmitting the sensor information to the external device such as the cloud server 300 and receiving the generated result.

The robot 100 may determine the moving path and the driving plans based on at least one of the object information generated using the sensor information or the object information acquired by the external device and may control the driver to drive the robot 100 along the determined moving path and according to the determined driving plans.

The map data may include object identification information on various types of objects arranged in a space in which the robot 100 moves. Examples of the map data may include object identification information on fixed objects such as walls and doors and movable objects such as flower pots and desks. The object identification information may include a name, types, distances, locations, and the like.

The robot 100 may also control the driver based on the control/interaction of the user, to perform the operation or drive. In this case, the robot 100 may obtain the intention information of the interaction according to the user's motion or voice utterance and may determine the response based on the obtained intention information to perform the operation.

The robot 100 may perform the autonomous driving using the AI technology. In this case, the robot 100 may be implemented as a movable robot, a vehicle, and an unmanned vehicle, and the like.

The autonomous robot 100 may include an autonomous driving controller that controls an autonomous driving and the autonomous driving controller may refer to software or a hardware chip. The autonomous driving controller may be a component of the autonomous robot 100 and may also be connected to an outside of the autonomous robot 100 as an additional hardware.

The autonomous robot 100 may acquire state information of the autonomous robot 100 using the sensor information obtained from various types of sensors, may detect (or recognize) the surrounding environment and the object or may generate map data, may determine the moving path and the driving plans, or may determine the operation.

The autonomous robot 100 may use sensor information obtained from at least one sensor among a LiDAR, a radar, and a camera, similar to the robot 100, in order to determine the moving path and the driving plans.

In particular, the autonomous robot 100 may recognize an environment of or an object disposed in an invisible area or an area away from a predetermined distance by receiving the sensor information from the external device or may receive information directly determined by the external device.

The autonomous robot 100 may perform the operations using the learning model including at least one ANN. For example, the autonomous robot 100 may recognize the surrounding environment and the object using the learning model and may define a driving path based on the recognized surrounding environment information or the object information. The learning model may be learned directly by the autonomous vehicle or an external device such as the AI server 300.

In this case, the autonomous robot 100 may perform the operation by generating the result using the learning model and may also perform the operation by transmitting the sensor information to the external device such as the cloud server 300 and receiving the generated result.

The autonomous robot 100 may determine the moving path and the driving plans using at least one of map data, object information generated based on sensor information, or object information obtained from an external device and may control the driver to drive the autonomous robot 100 along the determined moving path and according to the driving plans.

The map data may include object identification information on various objects arranged in a space (e.g., a road) in which the autonomous vehicle, i.e., autonomous robot 100 drives. For example, the map data may include object identification information on fixed objects such as streetlights, rocks, buildings, and movable objects such as vehicles and pedestrians. The object identification information may include a name, type, distances, locations, and the like.

The autonomous robot 100 may also control the driver based on the control/the interaction of the user to perform the operation or drive. In this case, the autonomous robot 100 may acquire the intention information of the interaction based on the user's motion or voice utterance and may determine the response based on the obtained intention information to perform the operation.

In some examples, the robot 100 may be implemented as a guide robot, a transport robot, a cleaning robot, a wearable robot, an entertainment robot, a pet robot, an unmanned flying robot, and the like, using the AI technology and the autonomous driving technology.

The autonomous robot 100 may be collectively referred to as a device that moves along the predetermined path without control of the user or moves by determining the path.

The autonomous robot 100 may use a sensing method to determine at least one of the moving path or the driving plans. For example, the autonomous robot 100 may determine at least one of the moving path or the driving plans based on the information sensed by the LiDAR, radar, and the camera.

Although components included in the exemplary embodiment of the present disclosure are described as being combined to one, or as being coupled to operate, such exemplary embodiment is not necessarily limited to this specific example, and these components may be selectively combined to one or more and coupled to operate within the purpose range of the present disclosure. Further, although all of the components may be implemented as an independent hardware, a part or all of each of the components may be selectively combined and implemented as a computer program that has a program module to perform a part or all of the functions combined in one or a lot of hardware. Codes and code segments that are included in the computer program may be easily deduced by those skilled in the art of the present disclosure. The computer program may be stored in computer readable media that a computer may read, and may be read and implemented by the computer, so as to implement the present disclosure. The memory medium of the computer program may include a memory medium including a semiconductor recording element, an optical recording medium, a magnetic recording medium. Further, the computer program that implements the embodiment of the present disclosure may include a program that is transmitted in real time through an external apparatus.

While the present disclosure has been mainly described referring to the exemplary embodiments of the present disclosure hereinabove, various modifications and changes can be made at the level of those skilled in the art. Therefore, unless such modifications and changes do not deviate from the range of the present disclosure, it will be understood that they are included in the scope of the present disclosure.

Other embodiments are within the scope of the following claims. The present disclosure provides a method for identifying, by a robot or a cloud server, a local area where the robot is located, in a large space, and then precisely estimating the position of the robot in that local area. The present disclosure also provides a method for dividing, by a robot or a cloud server, a large space into local areas and acquiring position information through at least one deep learning network optimized for each local area, which is used to estimate the position of the robot. The present disclosure further provides a method for acquiring, by a robot or a cloud server, position information based on the configurations of local areas, and the configurations are optimized for position information acquisition in the large space.

According to an embodiment of the present disclosure, there is provided a robot estimating a position in each of the local area of a large space. The robot may include the local area classifier configured to identify the local area among the plurality of local areas of the space where the robot moves and a plurality of position estimators configured to estimate the position of the robot in the each of the local areas.

According to an embodiment of the present disclosure, there is provided a robot of estimating a position in each of the local areas in a large space. The robot may include at least one of a local area classifier or a position estimator and a controller configured to input an image photographed by the camera sensor to a local area classifier to identify the local area in which the robot is located, and input the image photographed by the camera sensor to a position estimator corresponding to the identified local area to generate the position information on the position in the local area.

According to an embodiment of the present disclosure, there is provided the robot estimating a position in each of the local area of a large space. The robot includes the controller configured to select one from at least two output local areas based on local area information on the local area where the robot is previously located or a probability of each of the at least two output local areas when the local area classifier outputs two or more local areas.

According to an embodiment of the present disclosure, the local area classifier of the robot of estimating the position in each of the local areas of the large space may generate a first prediction result using a first image input at a first time point, may generate a second prediction result using a second image input at a second time point, where the second time point follows the first time point, and a similarity between the identified local area and a first local area corresponding to the first prediction result is less than or equal to a similarity between the identified local area and a second local area corresponding to the second prediction result.

According to an embodiment of the present disclosure, there is provided a cloud server estimating the position in each of the local area in the large space. The cloud server may include at least one of a local area classifier configured to identify the local area of a plurality of local areas of the space where the robot moves or a plurality of position estimators configured to estimate the position of the robot in each of the local areas.

According to an embodiment of the present disclosure, there is provided a cloud server estimating a position in each of the local area of a large space. The cloud server may include at least one of a local area classifier or a position estimator, and a server controller configured to generate identification information of a local area of the image received by the communicator or position information on the position in the local area.

According to an embodiment of the present disclosure, there is provided the cloud server estimating the position in each of the local area of the large space. The cloud server includes the server controller configured to select one from the at least two output local areas based on local area information on the local area in which the robot is previously located or a probability of each of the output two or more local areas when the local area classifier of the cloud server outputs at least two local areas.

According to an embodiment of the present disclosure, there is provided a method for estimating a position in each of the local area of a large space. The method may include photographing, by a camera sensor of a robot, the space in which the robot moves, receiving, by a local area classifier of a controller of the robot, the image and identifying the local area in which the robot is located, selecting, by the controller, a position estimator corresponding to the identified local area, among a plurality of position estimators, where the robot includes a plurality of position estimators, and inputting, by the controller, the image photographed by the camera sensor to the position estimator and generating, by the position estimator, position information on the position in the local area.

When embodiments of the present disclosure are applied, the robot or the cloud server may identify the local area where the robot is located and then may precisely estimate the position of the robot in that local area.

When embodiments of the present disclosure are applied, the robot or the cloud server may divide the large space into local areas and may acquire the position information using deep learning network for estimating position, and the deep learning network is optimized for each local area.

When embodiments of the present disclosure are applied, the robot or the cloud server may acquire the position information based on the configurations of local areas, and the configurations are optimized for position information acquisition in the large space.

Further effects of the present disclosure, in addition to the above-mentioned effects, are described together while describing specific matters to implement the present disclosure.

In some examples, terms such as first, second, A, B, (a), (b) and the like may be used herein when describing elements of the present disclosure. These terms are intended to distinguish one element from other elements, and the essence, order, sequence, or number of corresponding elements is not limited by these terms. It should be noted that if it is described in the present disclosure that one component is "connected," "coupled" or "joined" to another component, the former may be directly "connected," "coupled" or "joined" to the latter or "connected," "coupled" or "joined" to the latter via another component.

Terms such as first, second, and the like may be used herein to describe elements of the present disclosure. These elements are not limited by these terms. These terms are intended to distinguish one element from another element. A first element may be a second element unless otherwise stated.

Unless otherwise stated, each component may be singular or plural throughout the disclosure.

In some examples, singular expressions used in the present disclosure include plural expressions unless the context clearly indicates otherwise. In the present disclosure, terms such as "including" or "comprising" should not be construed as necessarily including all of the various components, or various steps described in the present disclosure, and terms such as "including" or "comprising" should be construed as not including some elements or some steps or further including additional elements or steps.

In the present disclosure, unless otherwise stated, "A and/or B" means A, B or A and B. Unless otherwise stated, "C to D" means "C or more and D or less".

In some examples, for convenience of description, one element may be described as its sub-elements in implementing the present disclosure; however, the sub-elements may be implemented in a single device or module in an integrated manner or implemented in multiple devices or modules in a distributed manner.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot to determine a position in a local area, comprising:
   a camera configured to photograph a space in which the robot is to be provided;
   a controller configured to:
      receive an image photographed by the camera,
      output, by a local area classifier, information including at least two local areas and probabilities on each local areas,
      identify, by the local area classifier, at least one local area, from among a plurality of local areas of the space, corresponding to location of the robot,
      select one of a plurality of position estimators based on the identified at least one local area, wherein each of the plurality of position estimators is separately associated with information of a different corresponding one of the local areas,
      provide, by the selected one of the position estimators, position information of the position of the robot in the at least one local area; and
   a driver configured to move the robot,
   wherein, when the local area classifier is to identify two or more local areas corresponding to the location of the robot, the controller is configured to select one of the two or more local areas based on local area information on the local area in which the robot is previously located or a probability of each of the two or more local areas, and
   wherein the local area classifier is configured to use time series data and remove previous position information within a predetermined range and to reflect new input using time series data to reflect time-dependent information;
   wherein when the position estimator does not output the position information, the controller selects local area with next highest probability among the outputted local areas; and
   wherein the controller repeatedly inputs the image accumulated during the movement of the robot to the local area classifier, and the local area classifier accumulates the images in chronological order and performs the prediction of the local area using the accumulated images.

2. The robot of claim 1,
wherein the local area classifier is configured to:
generate a first prediction result based on a first image input at a first time point and to generate a second prediction result based on a second image input at a second time point,
wherein the second time point is subsequent to the first time point, and
wherein a similarity between the identified at least one local area and a first local area corresponding to the first prediction result is less than or equal to a similarity between the identified at least one local area and a second local area corresponding to the second prediction result.

3. The robot of claim 2,
wherein when the robot is determined to be located at an intersection in the space, the controller is configured to control the driver to move the robot while forming a closed-loop path at the intersection, and control the camera to photograph a plurality of images, and
wherein the local area classifier is configured to identify the local area in which the robot is currently located based on the photographed plurality of images.

4. The robot of claim 2,
wherein when the robot is determined to not be located at an intersection in the space, the controller is to control the driver to move the robot from a first position which is a current robot position to a second position and return back to the first position, and the controller is to control the camera to photograph a plurality of images when the robot returns to the first position or photograph a plurality of images while rotating when the robot is located at the first position, and
wherein the local area classifier is configured to identify the local area in which the robot is currently located based on the photographed plurality of images.

5. The robot of claim 1, wherein the controller is configured to:
identify intersections based on images photographed during movement of the robot or a pre-stored map, and
calculate a distance between the identified intersections to divide the space in which the robot moves into one of the local areas having one of the intersections or the local areas disposed between the identified intersection.

6. The robot of claim 5, wherein the local area comprises an overlapping area overlapping an adjacent local area of the plurality of local areas.

7. The robot of claim 5, wherein the local area classifier is configured to receive the photographed images of the plurality of local area and perform learning on the local areas based on the photographed images.

8. The robot of claim 1, wherein the robot is to receive signal from a transmitter used in store or office, and the controller is configured to identify the local area based on Wi-Fi identification information of the transmitter.

9. A cloud server to estimate a position of a robot in a local area, comprising:
a communicator configured to receive, from the robot, an image of a space in which the robot is provided;
a local area classifier configured to output information including at least two local areas and probabilities on each local areas, and identify at least one local area, from a plurality of local areas of the space, corresponding to a location of the robot, based on the received image;
a plurality of position estimators each associated with information of a separate corresponding one of the local areas, and one of the position estimators is selected to estimate a position of robot based on the identified at least one local area and based on the image, and
a server controller configured to provide position information of the position of the robot in the at least one local area,
wherein the communicator is configured to transmit the position information of the position of the robot in the at least one local area;
wherein, when the local area classifier is to identify two or more local areas corresponding to the location of the robot, the server controller is configured to select one of the two or more local areas based on local area information on the local area in which the robot is previously located or a probability of each of the two or more local areas, and
wherein the local area classifier is configured to use time series data and remove previous position information within a predetermined range and to reflect new input using time series data to reflect time-dependent information;
wherein when the position estimator does not output the position information, the server controller selects local area with next highest probability among the outputted local areas; and
wherein the server controller repeatedly inputs the image received to the local area classifier, and the local area classifier accumulates the images in chronological order and performs the prediction of the local area using the accumulated images.

10. The cloud server of claim 9,
wherein the local area classifier is configured to:
generate a first prediction result based on a first image input at a first time point and to generate a second prediction result based on a second image input at a second time point,
wherein the second time point is subsequent to the first time point, and
wherein a similarity between the identified at least one local area and a first local area corresponding to the first prediction result is less than or equal to a similarity between the identified at least one local area and a second local area corresponding to the second prediction result.

11. The cloud server of claim 9, wherein the server controller is configured to:
identify intersections based on images photographed during movement of the robot or a pre-stored map,
calculate a distance between the identified intersections, and
classify the space in which the robot moves into one of the local areas having the intersection or at least two local areas having at least one overlapping area.

12. The cloud server of claim 11,
wherein the local area comprises an overlapping area overlapping with an adjacent local area of the plurality of local areas, and
wherein the local area classifier is configured to receive the photographed image for each of the local areas and to perform learning on the local areas based on the photographed images.

13. The cloud server of claim 9, wherein the robot is to receive signal from a transmitter used in store or office, and the server controller is configured to identify the local area based on Wi-Fi identification information of the transmitter.

14. A method for estimating a position in a local area, comprising:
    photographing, by a camera of a robot, a space in which the robot is to be provided;
    outputting, by a local area classifier, information including at least two local areas and probabilities on each local areas,
    identifying, by the local area classifier of a controller of the robot, at least one local area, of a plurality of local areas of the space, corresponding to location of the robot;
    selecting, by the controller, a position estimator from among a plurality of position estimators based on the identified at least one local area; and
    providing, by the selected one of the position estimators, position information on the position of the robot in the at least one local area;
    wherein when the local area classifier identifies at least two local areas corresponding to the location of the robot, selecting, by the controller, one of the at least two local areas based on local area information on the local area in which the robot is previously located or a probability of each of the at least two local areas; and
    wherein the local area classifier uses time series data and removes previous position information within a predetermined range and reflects new input using time series data to reflect time-dependent information;
    wherein when the position estimator does not output the position information, the controller selects local area with next highest probability among the outputted local areas; and
    wherein the controller repeatedly inputs the image accumulated during the movement of the robot to the local area classifier, and the local area classifier accumulates the images in chronological order and performs the prediction of the local area using the accumulated images.

15. The method of claim 14, further comprising generating, by the local area classifier, a first prediction result based on a first image input at a first time point and generating a second prediction result based on a second image input at a second time point,
    wherein the second time point is subsequent to the first time point, and
    wherein a similarity between the identified at least one local area and a first local area corresponding to the first prediction result is less than or equal to a similarity between the identified at least one local area and a second local area corresponding to the second prediction result.

16. The method of claim 15, comprising:
    instructing the robot to move while forming a closed-loop path at an intersection based on the controller determining that the robot is currently located at the intersection based on the image,
    moving from a first position which is a current robot position to a second position and returning back to the first position based on a determination that the robot is not currently located at the intersection or instructing rotation of the camera sensor when the robot is located at the first position, and
    receiving, by the local area classifier, a plurality of images photographed by the robot.

17. The method of claim 14, further comprising:
    identifying, by the controller, intersections based on images photographed during movement of the robot or a pre-stored map; and
    calculating a distance between the identified intersections to divide the space in which the robot moves into one of the local areas having the intersection or the local areas disposed between the identified intersections.

18. The method of claim 17, wherein the local area comprises an overlapping area overlapping with an adjacent local area of the plurality of local areas.

19. The method of claim 17, further comprising receiving, by the local area classifier, the image photographed for each local area and to perform learning on the local areas based on the photographed images.

20. The method of claim 14, wherein the robot is to receive signal from a transmitter used in store or office, and the method comprises:
    identifying, by the controller, the local area based on Wi-Fi identification information of the transmitter.

* * * * *